(12) United States Patent
Kuo et al.

(10) Patent No.: US 9,151,461 B1
(45) Date of Patent: Oct. 6, 2015

(54) LENS FOR A VEHICULAR LAMP

(71) Applicants: Yao-Yuan Kuo, Tainan (TW);
Shang-kuei Tai, Taipei (TW)

(72) Inventors: Yao-Yuan Kuo, Tainan (TW);
Shang-kuei Tai, Taipei (TW)

(73) Assignee: MIN HSIANG CORPORATION,
Tainan (TW)

( * ) Notice: Subject to any disclaimer, the term of this patent is extended or adjusted under 35 U.S.C. 154(b) by 0 days.

(21) Appl. No.: 14/456,395

(22) Filed: Aug. 11, 2014

(51) Int. Cl.
| | |
|---|---|
| *F21V 5/00* | (2015.01) |
| *F21S 8/10* | (2006.01) |
| *F21W 101/14* | (2006.01) |
| *F21Y 101/02* | (2006.01) |
| *F21W 101/10* | (2006.01) |

(52) U.S. Cl.
CPC .......... *F21S 48/2212* (2013.01); *F21S 48/2275* (2013.01); *F21S 48/2281* (2013.01); *F21W 2101/10* (2013.01); *F21W 2101/14* (2013.01); *F21Y 2101/02* (2013.01)

(58) Field of Classification Search
CPC .............. F21S 48/2212; F21S 48/1283; F21S 48/1233; F21S 48/215; F21S 48/10; F21S 48/1208; F21S 48/145; F21S 48/1258; F21S 48/2281; F21S 48/2275; F21S 48/2262; F21S 48/2268; F21S 48/2256; F21S 48/2243; F21S 48/225; F21W 2101/14; F21W 2101/10; F21Y 2101/02; B60Q 1/26–1/488; G02B 6/0018; G02B 6/0021; G02B 6/0035; G02B 6/0036

USPC ................ 362/522, 520, 507, 509, 335–340, 362/538–539, 475, 487
See application file for complete search history.

(56) References Cited

U.S. PATENT DOCUMENTS

| | | | | |
|---|---|---|---|---|
| 3,759,084 | A * | 9/1973 | Plewka ..................... | 362/311.03 |
| 5,136,483 | A * | 8/1992 | Schoniger et al. ............ | 362/545 |
| 5,984,497 | A * | 11/1999 | Foerstner et al. ............. | 362/511 |
| 6,619,829 | B1 * | 9/2003 | Chen ............................. | 362/544 |
| 7,144,144 | B2 * | 12/2006 | Hsu ............................... | 362/543 |
| 7,220,033 | B1 * | 5/2007 | Yeh ............................... | 362/545 |
| 2008/0002400 | A1 * | 1/2008 | Huang .......................... | 362/216 |
| 2008/0310187 | A1 * | 12/2008 | Huang .......................... | 362/615 |
| 2011/0157899 | A1 * | 6/2011 | Ko ................................. | 362/307 |
| 2013/0003398 | A1 * | 1/2013 | Godbillon .................... | 362/511 |
| 2014/0212090 | A1 * | 7/2014 | Wilcox et al. .................. | 385/27 |
| 2015/0219303 | A1 * | 8/2015 | Kai et al. ...................... | 362/551 |

* cited by examiner

*Primary Examiner* — Anne Hines
*Assistant Examiner* — Jose M Diaz

(57) ABSTRACT

A lens for a vehicular lamp includes an outer annular portion and a central portion. The outer annular portion surrounds a central axis and includes an incident face on a rear thereof. The outer annular portion further includes a light guiding portion in front of the incident face. The light guiding portion includes a reflective face on an outer side thereof. The central portion is surrounded by the outer annular portion and is connected to the light guiding portion. The central portion includes front and rear faces. The front face includes an outer edge connected to the reflective face. The rear face includes a plurality of grooves. A portion of light rays from a light source entering the light guiding portion via the incident face transmits out of the lens via the reflective face. Another portion of the light rays is reflected to the central portion and reaches the grooves.

6 Claims, 5 Drawing Sheets

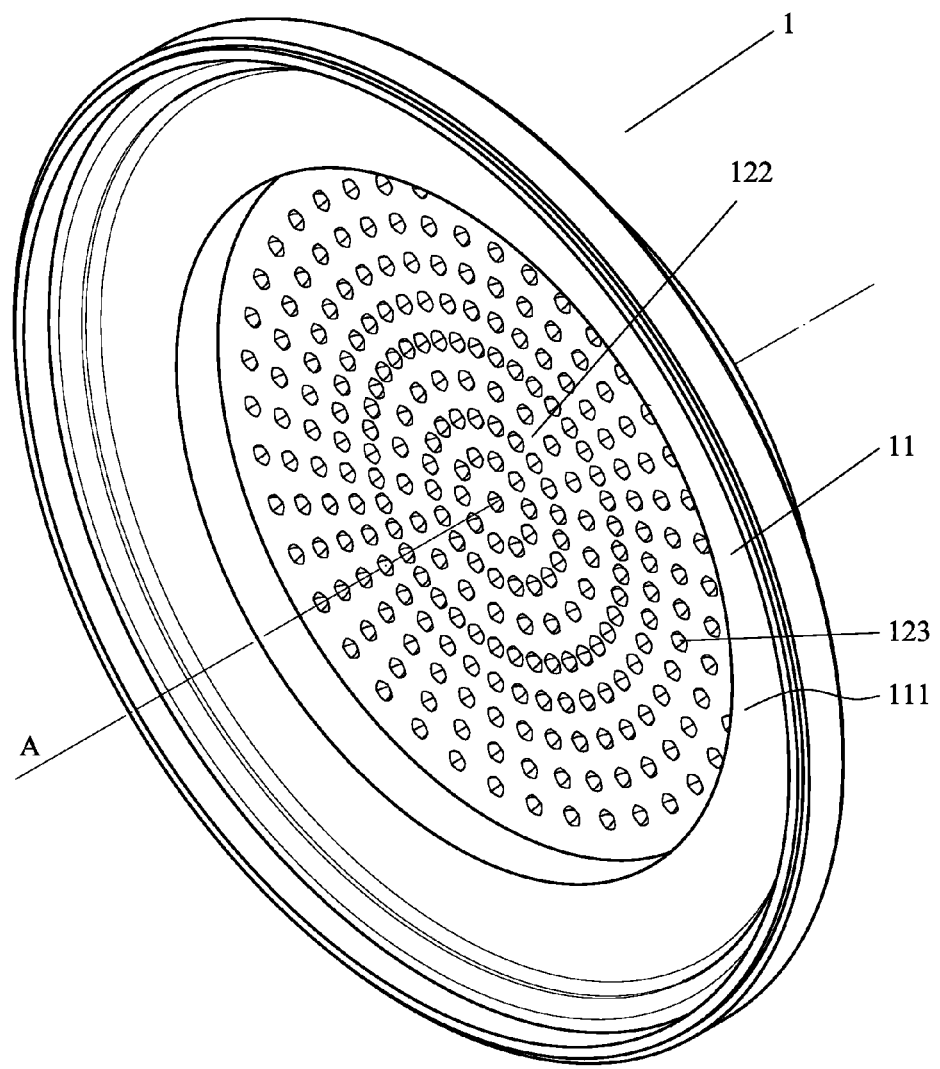
F I G . 1

LENS FOR A VEHICULAR LAMP

BACKGROUND OF THE INVENTION

The present invention relates to a lens for a vehicular lamp and, more particularly, to a lens capable of generating point light sources.

Conventional vehicular lamps generally include a lighting element in a lamp housing, and a lens is mounted to a front of the lamp housing. The light rays emitted by the lighting element transmit the lens to provide a lighting effect.

Vehicular lamps of new models generally use light emitting diodes (LED) as the lighting elements. A plurality of LEDs is mounted in a vehicle lamp to increase the lighting effect. The light rays of each LED are simultaneously emitted out of the lens of the vehicular lamp to provide a visual effect of point light sources corresponding to the locations of the LEDs.

However, each point light source requires a corresponding LED, leading to an increase in the costs and the consumed energy if the vehicular lamp has many point light sources.

BRIEF SUMMARY OF THE INVENTION

An objective of the present invention is to provide a lens generating a main light source in an outer annular portion thereof and point light sources in a central portion thereof while reducing the costs of lighting elements and the energy consumed by the lighting elements.

A lens for a vehicular lamp includes an outer annular portion and a central portion. The outer annular portion surrounds a central axis and includes an incident face on a rear thereof. The outer annular portion further includes a light guiding portion in front of the incident face. The light guiding portion includes a reflective face on an outer side thereof. The central portion is surrounded by the outer annular portion and is connected to the light guiding portion. The central portion includes a front face and a rear face spaced from the front face along the central axis. The front face includes an outer edge connected to the reflective face. The rear face includes a plurality of grooves recessed towards the front face. A portion of light rays from a light source entering the light guiding portion via the incident face of the outer annular portion is adapted to transmit out of the lens via the reflective face. Another portion of the light rays is adapted to be reflected to the central portion and to reach the plurality of grooves.

Each of the front face and the rear face can extend perpendicularly to the central axis, and the front face is parallel to the rear face.

The reflective face can be conical.

The outer annular portion can be a ring surrounding the central axis, and the reflective face of the outer annular portion can have reducing diameters towards the front face of the central portion.

A plurality of lighting elements is adapted to be mounted behind the incident face of the lens. The plurality of lighting elements is arranged in a circumferential direction about the central axis. Each of the plurality of lighting elements forms the light source. The portion of the light rays emitted by each of the plurality of lighting elements is adapted to transmit the lens via the reflective face. The portions of the light rays from the plurality of lighting elements emitted via the reflective face together form an annular lighting area. The another portion of the light rays emitted by each of the plurality of lighting elements is adapted to be reflected by the reflective face to the plurality of grooves. Each of the plurality of grooves is adapted to focus the second portions of the light rays to form a point light source. The plurality of grooves provides a point source lighting area.

Each of the plurality of lighting elements can be a light emitting diode.

The present invention will become clearer in light of the following detailed description of illustrative embodiments of this invention described in connection with the drawings.

DESCRIPTION OF THE DRAWINGS

FIG. 1 is a rear, perspective view of a lens for a vehicular lamp according to the present invention.

DETAILED DESCRIPTION OF THE INVENTION

Figure 2:
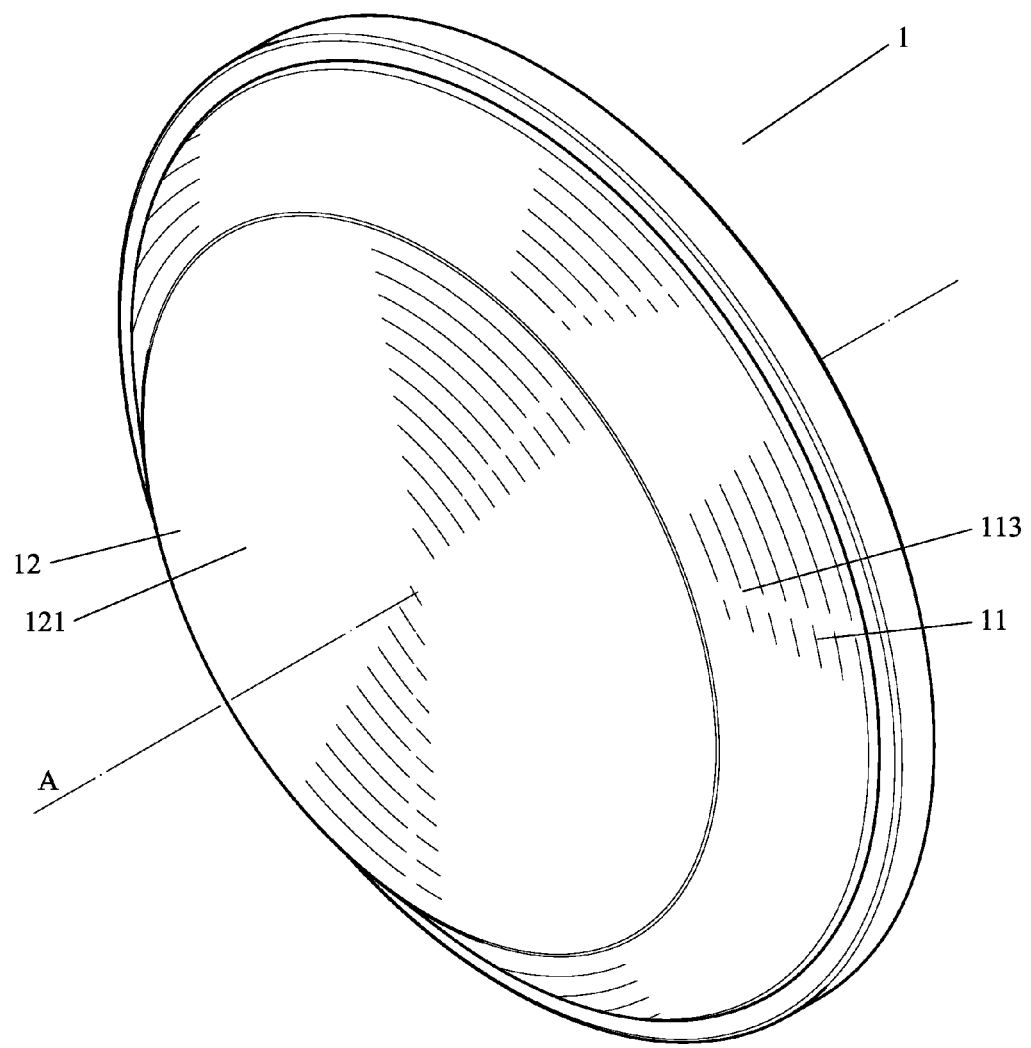
FIG. 2 is a front, perspective view of the lens of FIG. 1.
Figure 3:
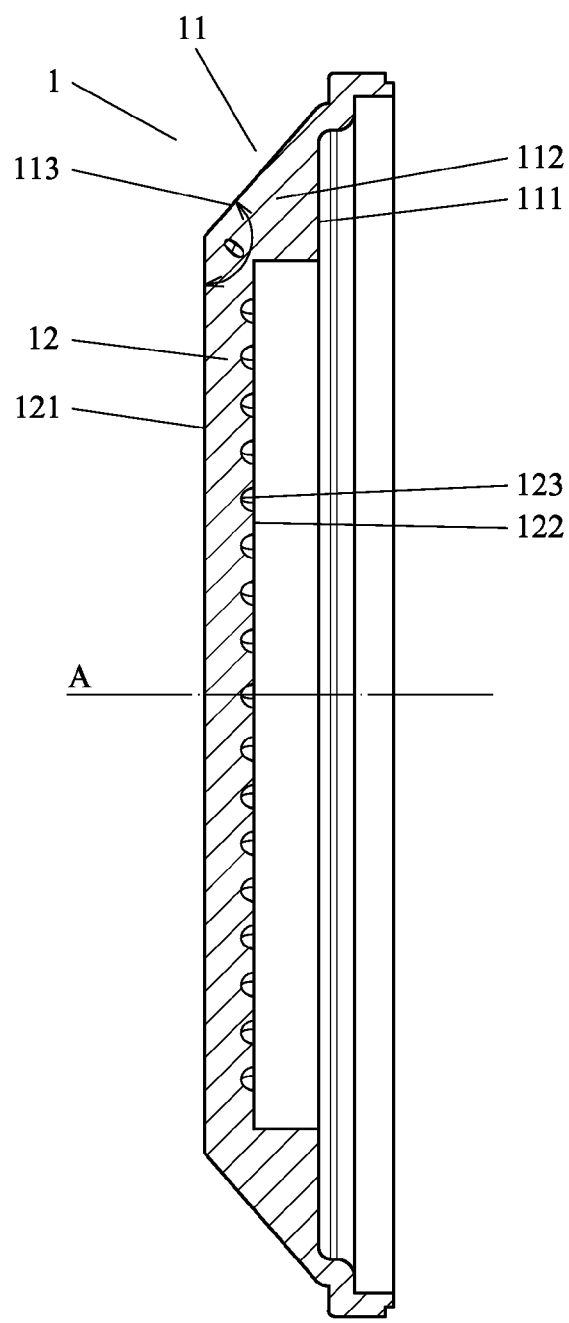
FIG. 3 is a cross sectional view of the lens of FIG. 1.

With reference to FIGS. 1-3, a lens 1 for a vehicular lamp according to the present invention includes an outer annular portion 11 and a central portion 12. The outer annular portion 11 surrounds a central axis A. In the form shown, the outer annular portion 11 is a ring surrounding the central axis A. The outer annular portion 11 includes an incident face 111 on a rear thereof. The outer annular portion 11 further includes a light guiding portion 112 in front of the incident face 111. The light guiding portion 112 includes a reflective face 113 on an outer side thereof. In the form shown, the reflective face 113 is conical and tapers forward.

The central portion 12 is surrounded by the outer annular portion 11 and is connected to the light guiding portion 112. The central portion 12 includes a front face 121 and a rear face 122 spaced from the front face 121 along the central axis A. In the form shown, each of the front face 121 and the rear face 122 extends perpendicularly to the central axis A, and the front face 121 is parallel to the rear face 122. The front face 121 includes an outer edge connected to the reflective face 113. The rear face 122 includes a plurality of grooves 123 recessed towards the front face 121. In the form shown, the reflective face 113 has reducing diameters towards the front face 121 of the central portion 12.

Figure 4:
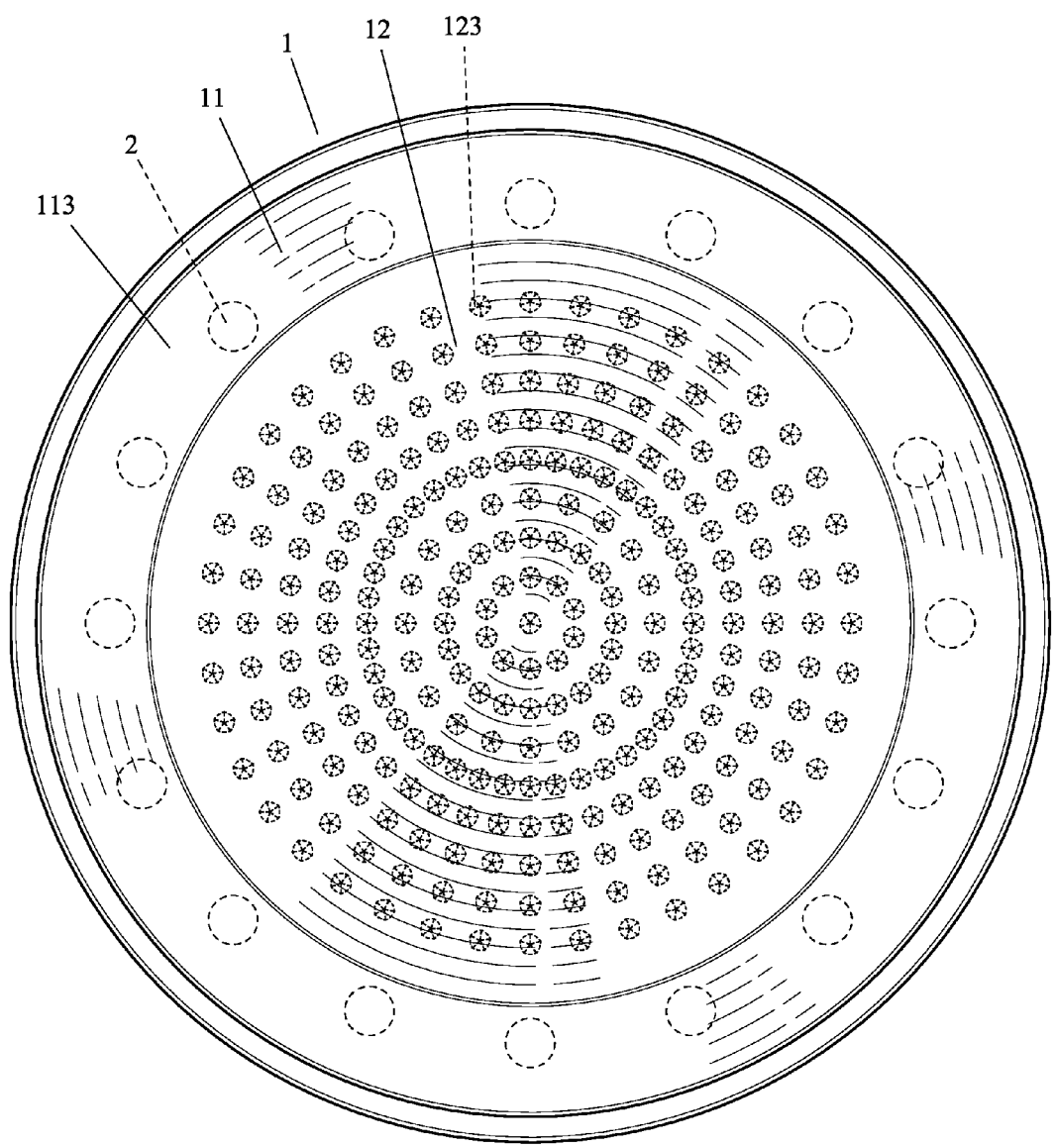
FIG. 4 is a front elevational view of the lens of FIG. 1, with light emitting diodes mounted behind the lens.
Figure 5:
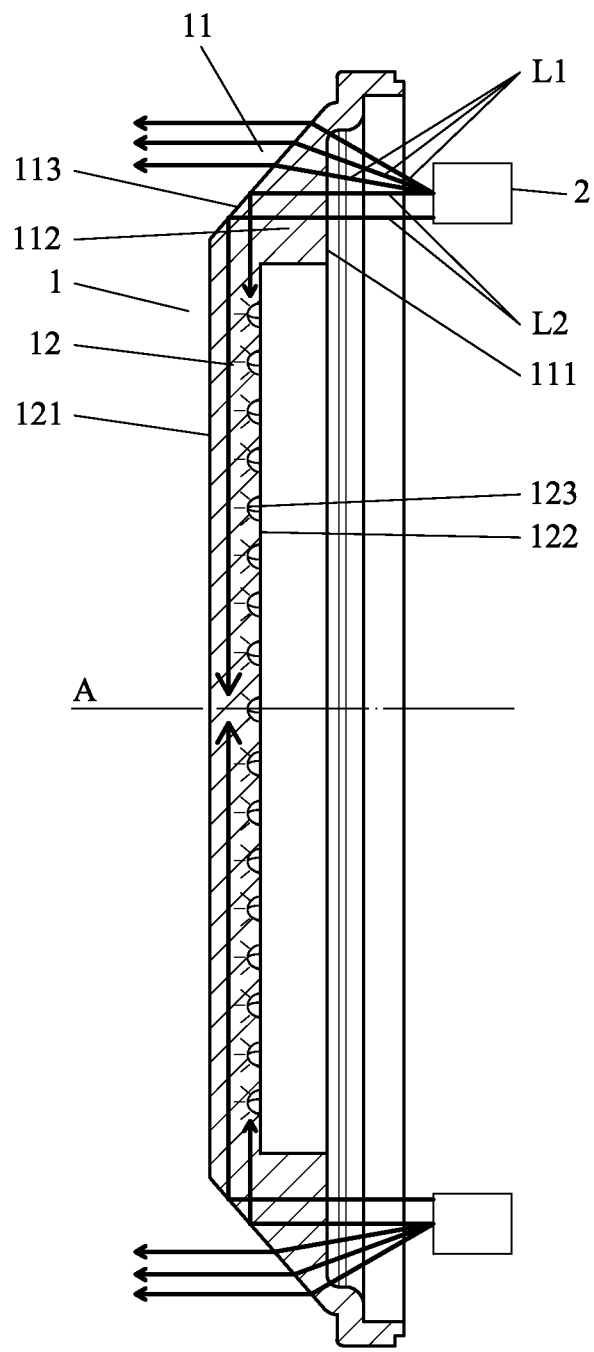
FIG. 5 is a cross sectional view of the lens of FIG. 4, illustrating the lighting effect of the light emitting diodes.

With reference to FIGS. 4 and 5, a plurality of lighting elements 2 (such as light emitting diodes) is adapted to be mounted behind the incident face 111 of the lens 1. The lighting elements 2 are arranged in a circumferential direction about the central axis A. Each lighting element 2 forms a light source. A portion L1 of the light rays emitted by each lighting element 2 enters the light guiding portion 112 and transmits out of the lens 1 via the reflective face 113. Thus, the portions L1 of the light rays from the lighting elements 2 emitted via the reflective face 113 together form an annular lighting area.

Another portion L2 of the light rays emitted by each lighting element 2 fulfilling the total reflection condition can be reflected by the reflective face 113 to the central portion 12. Each groove 123 in the central portion 12 can focus another portions L2 of the light rays from the lighting elements 2 to form a point light source. Thus, the grooves 123 provide a point source lighting area. As a result, the vehicular lamp using the lens 1 presents a better lighting effect, because both the outer annular portion 11 and the central portion 12 of the lens 1 can emit light, preventing the situation of a hollow dark area in the center of the vehicular lamp. Furthermore, a vehicular lamp using the lens 1 according to the present invention can be used as a tail light or daytime running light or used in another location to provide a better lighting and alarming effect.

An angle θ between the reflective face 113 and the front face 121 of the central portion 12 can be varied according to differing needs. In a case that the angle θ is small, more light rays can enter the central portion 12 such that the point light sources provided by the grooves 123 can be brighter. On the other hand, if the angle θ is large, the annular light source at the outer annular portion 11 is brighter. Thus, the lens 1 according to the present invention can provide different effects.

Since the point light source of each groove 123 in the central portion 12 does not have to be generated by a corresponding lighting element 2, the component costs of the lens 1 can be significantly reduced while reducing the energy consumed. Furthermore, the grooves 123 in the central portion 12 can be arranged in any desired pattern and can easily be manufactured without the need of arranging the locations of conventional light emitting diodes. Thus, the lens 1 according to the present invention is more suitable for vehicular lamps.

Although specific embodiments have been illustrated and described, numerous modifications and variations are still possible without departing from the scope of the invention. The scope of the invention is limited by the accompanying claims.

The invention claimed is:

1. A lens for a vehicular lamp comprising:
an outer annular portion surrounding a central axis, with the outer annular portion including an incident face on a rear thereof, with the outer annular portion further including a light guiding portion in front of the incident face, and with the light guiding portion including a reflective face on an outer side thereof; and
a central portion surrounded by the outer annular portion and connected to the light guiding portion, with the central portion including a front face and a rear face spaced from the front face along the central axis, with the front face including an outer edge connected to the reflective face, with the rear face including a plurality of grooves recessed towards the front face, with a portion of light rays from a light source entering the light guiding portion via the incident face of the outer annular portion adapted to transmit out of the lens via the reflective face, and with another portion of the light rays adapted to be reflected to the central portion and to reach the plurality of grooves.

2. The lens for a vehicular lamp as claimed in claim 1, with each of the front face and the rear face extending perpendicularly to the central axis, and with the front face parallel to the rear face.

3. The lens for a vehicular lamp as claimed in claim 1, wherein the reflective face is conical.

4. The lens for a vehicular lamp as claimed in claim 1, with the outer annular portion being a ring surrounding the central axis, and with the reflective face of the outer annular portion having reducing diameters towards the front face of the central portion.

5. The lens for a vehicular lamp as claimed in claim 4, with a plurality of lighting elements adapted to be mounted behind the incident face of the lens, with the plurality of lighting elements arranged in a circumferential direction about the central axis, with each of the plurality of lighting elements forming the light source, with the portion of the light rays emitted by each of the plurality of lighting elements adapted to transmit the lens via the reflective face, with the portions of the light rays from the plurality of lighting elements emitted via the reflective face together forming an annular lighting area, with the another portion of the light rays emitted by each of the plurality of lighting elements adapted to be reflected by the reflective face to the plurality of grooves, with each of the plurality of grooves adapted to focus the second portions of the light rays to form a point light source, and with the plurality of grooves providing a point source lighting area.

6. The lens for a vehicular lamp as claimed in claim 5, wherein each of the lighting elements is a light emitting diode.

* * * * *